UNITED STATES PATENT OFFICE.

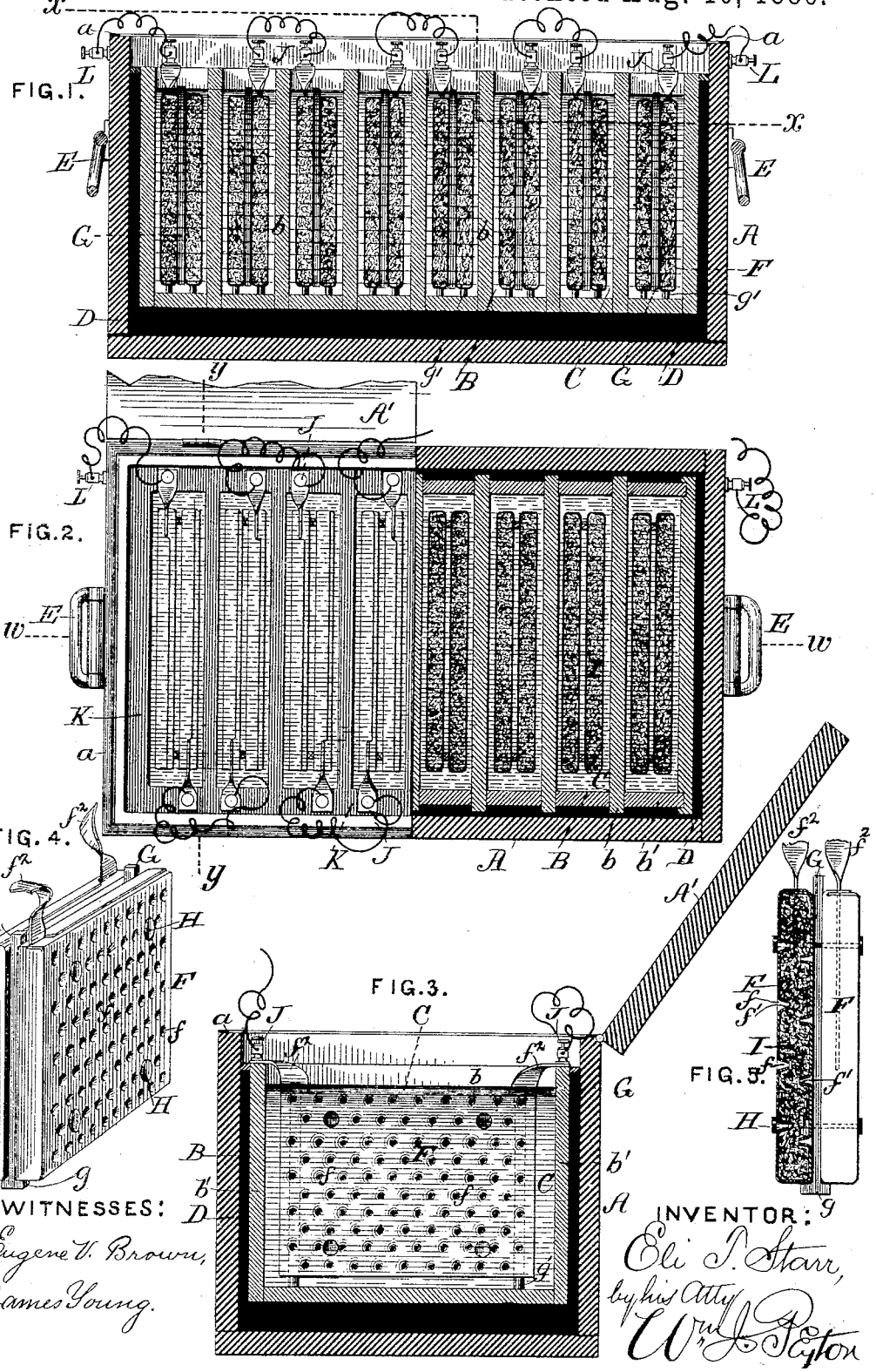

ELI T. STARR, OF PHILADELPHIA, PENNSYLVANIA, ASSIGNOR, BY DIRECT AND MESNE ASSIGNMENTS, TO THE STARR ELECTRIC STORAGE COMPANY, OF CAMDEN, NEW JERSEY.

SECONDARY BATTERY.

SPECIFICATION forming part of Letters Patent No. 347,258, dated August 10, 1886.

Application filed May 26, 1883. Serial No. 96,305. (No model.)

*To all whom it may concern:*

Be it known that I, ELI T. STARR, of the city and county of Philadelphia, in the State of Pennsylvania, have invented certain new and useful Improvements in Secondary Batteries, of which the following is a specification.

My invention relates more particularly to secondary batteries—that is, to batteries which are charged or put into condition for generating electric currents by the action of a current of electricity caused to flow through them, the work of the charging-current being recovered by connecting the electrodes of the battery by an electric conductor including suitable apparatus.

My invention belongs more particularly to secondary batteries which depend for their action on the oxidation and reduction of lead.

The object of my said invention is to provide a comparatively light and cheap battery which is capable of being rapidly manufactured, and possesses increased electrical efficiency and durability, among other desirable practical advantages.

The subject-matter claimed is hereinafter particularly pointed out at the close of the specification.

Some of my improvements may be used without the others and with batteries differing from that herein particularly described.

In the accompanying drawings I have shown my improvements as embodied in the best way now known to me.

In said drawings, Figure 1 is a vertical section through a battery embodying my improvements on the line *w w* of Fig. 2. Fig. 2 is a partial plan and section thereof with the lid of the battery-vessel thrown back, the section being taken on the line *x x* of Fig. 1. Fig. 3 is a transverse section through the battery on the line *y y* of Fig. 2. Fig. 4 is a perspective view of two electrodes constituting one of the elements of the battery. Fig. 5 is a view of the element shown in Fig. 4, one electrode being in end elevation and the other in section.

The battery-vessel is a compound one. The outer box, A, receives a series of vessels, B, which may be of wood, glass, or other suitable material. The sides or partitions *b* of said inner boxes, B, preferably project beyond the ends *b'* of said boxes a short distance, as clearly shown in Fig. 2. When the inner boxes, B, are made of wood, they are preferably prepared in well-known ways—as by soaking them in paraffine, for instance, so as to free them as much as practicable from the action of the usual dilute sulphuric acid, C, constituting the electrolytic fluid of the battery in this example.

Between the inner vessels, B, and the outer or main vessel, A, there is a lining, D, of preferably substantially acid-proof substance—such as roofing-cement or coal-tar—which may be put into a fluid form, to completely flow around and envelop the bottom and ends of the inner series of boxes, as well as the outer sides of the end boxes, and then "set" or become hard, to constitute a solid impervious protective lining. It will be noticed that the partitions or sides *b*, other than the end ones, are common to two cells. Instead of this construction, however, the series of inner vessels, B, may be independent cells of glass, for example, and be slightly separated from each other, so that the lining D may surround not only the ends and bottom of all the inner vessels, but the sides also. This is an obvious change, and it is advantageous in some instances, as better insulation of the cells is afforded, while if the cells or vessels be made of glass or other fragile material they may thus be isolated and prevented, in a great measure, from breaking. It will be noticed that the lining D will securely seal all the joints in the inner series of boxes, B, when made of separate pieces or in sections, as in Figs. 1, 2, and 3, and this is more especially due to the fact that the partitions or sides *b* are extended beyond the ends of the boxes, as before described. By this extension of the partitions *b*, also, a more secure hold of the lining D upon the inner boxes, B, is attained.

The above organization of the compound box affords a very desirable one for a trough-battery. The outer or main box, A, is provided with suitable handles, E E, preferably at its ends, for convenience of handling and transportation, while its top is covered by a preferably hinged lid or cover, A', between which and the upper edge of the box A a rubber or other suitable packing, $a$, is secured, to seal the outer box fluid-tight when the cover is fastened down, as for transportation, or when the battery is designed for use on moving vehicles or vessels, for instance, where it will be subjected to sudden jolts or jerks.

The electrodes, of which I prefer there shall be two in each cell B, are each preferably made up of a metal shell or casing, F, cast or otherwise formed, and having its sides perforated with numerous holes, $f$, and, in addition, on its inner sides or faces provided with projections or points $f'$. If the shell or casing F is made up of sheet metal, with its joints soldered or otherwise secured, I prefer to form the holes in the sides of the casing by a pointed punch or series of punches, so that in addition to forming the holes or perforations in the sides of the shell there will also be formed a series of points or projections, $f'$, as clearly shown in Fig. 5.

The two electrodes making up one of the elements are preferably bound together with a space between them, and this I prefer to accomplish by means of insulating strips or bars G—such as wood or hard-rubber strips—one at each end, the electrodes being bound together and upon the strips G by stout rubber bands encircling the electrodes, or by means of insulating rivets or pins H, or by other suitable fastenings, as clearly shown in Figs. 3, 4, and 5.

The shells or casings F are preferably made of lead, and constitute chambers or receptacles for finely-divided active material or material to be made active, I, such as finely-divided lead, lead peroxide, minium, or other suitable material. I preferably employ metallic lead cut into very fine strips or threads, packed lightly together, so as to be thoroughly porous.

The element, made up, as above described, of two perforated electrodes bound together, is placed in its cell and separated from the bottom while resting upon it by means of the knobs or heads $g$ at the lower ends of the separating-strips G, as clearly shown in Figs. 4 and 5. This prevents short-circuiting of the electrodes at the bottom by the collection or accumulation of sediment in the bottom of the cell.

Instead of utilizing the lower ends of the separating-strips G as a means of insulating the electrodes from the bottom of the cell, each electrode at its bottom may be provided near its opposite ends with an insulating projecting knob or pin, $g'$, as shown in Figs. 1 and 3.

By the perforations in the sides of the electrodes free access to the finely-divided material is given to the electrolytic fluid, and the chemical action upon which the battery depends for its action and efficiency thus goes on without material obstruction, the finely-divided material I being the chief active agent.

Instead of making the conducting connection with the shell or casing F direct, I may pass a strip or band, $f^2$—say of lead—down into the active mass or mass to be made active near one end of the electrode, and then bend it at about a right angle, to electrically connect it with a binding screw or post, J, at the upper edge of the cell, as in Figs. 1 and 3. Said binding-post, however, may be mounted upon a separate frame, K, fitted in the outer vessel above the inner boxes, as shown in Fig. 2, and the connections made by passing the strip $f^2$ through said frame, as shown in said figure.

The several cells of the battery may be connected up in an obvious manner, either for quantity or intensity. In the present example the connections are shown as made for intensity.

The battery I have shown consists of what may be called a "trough-battery" of eight elements, and this number I have found to be very advantageous for many practical uses. Any number of cells may be employed, of course.

It will be noticed that the binding-screws J, for connecting up the elements, are located within the outer vessel, and this is desirable, in that it avoids the use of external binding-posts and permits the lid to be shut down tight without inconvenient obstructions. The end plates or electrodes of the series of elements are connected with the external binding screws or posts, L L, at opposite ends of the outer vessel, to facilitate connections with the charging and working circuits.

In the drawings I have shown the casings or shells F as perforated on both sides with numerous holes. In practice, however, I have found it sometimes desirable to have only one side perforated—to wit, the sides of the electrodes facing each other—and the opposite sides coated or painted with a protective varnish or cement. Thus one side only of the electrode is exposed for the chemical action which takes place in the battery.

I reserve the right hereafter to file an application or applications for any and all patentable features or subject-matter of my invention disclosed or substantially indicated herein, but not specifically claimed or covered by the following claims.

I claim herein as my invention—

1. The battery-vessel consisting of the external vessel, the series of internal cells or vessels, and the lining between said interior vessels and said exterior vessel, the tops of said internal vessels being below the top edge of the outer vessel, substantially as described, whereby room is afforded inside the outer vessel for the binding-connections.

2. The compound battery-vessel consisting of the external vessel, the internal vessels, or cells below the top of said external vessel, and the lining between said interior vessels and said exterior vessel, in combination with a separate open frame fitted in said outer vessel above the inner vessels and carrying the binding-connections, substantially as described.

3. A secondary battery the opposing plates or electrodes of which are bound together independently of the battery-vessel, substantially as described, and have their opposing faces separated from contact by means of a non-conducting strip or strips interposed between them, and said strip or strips being extended below said plates or electrodes to insulate them from the bottom of the battery-cell while resting thereon, substantially as described.

4. A secondary battery the opposing plates or electrodes of which are bound together by clamping devices upon, and have their opposing faces separated by, an interposed non-conducting separator which extends below said plates or electrodes and insulates the same from the bottom of the battery-vessel, substantially as described.

In testimony whereof I have hereunto subscribed my name this 25th day of May, A. D. 1883.

ELI T. STARR.

Witnesses:
WM. J. PEYTON,
EUGENE V. BROWN.